(12) United States Patent
Khosla

(10) Patent No.: US 10,618,537 B2
(45) Date of Patent: *Apr. 14, 2020

(54) AUTONOMOUS RAIL OR OFF RAIL VEHICLE MOVEMENT AND SYSTEM AMONG A GROUP OF VEHICLES

(71) Applicant: Vinod Khosla, Menlo Park, CA (US)

(72) Inventor: Vinod Khosla, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/125,019

(22) Filed: Sep. 7, 2018

(65) Prior Publication Data

US 2019/0248396 A1     Aug. 15, 2019

Related U.S. Application Data

(63) Continuation-in-part of application No. 15/959,077, filed on Apr. 20, 2018, which is a continuation-in-part of application No. 15/894,783, filed on Feb. 12, 2018.

(51) Int. Cl.
*B61L 27/04*     (2006.01)
*B61L 25/02*     (2006.01)
(Continued)

(52) U.S. Cl.
CPC .......... *B61L 27/04* (2013.01); *B61L 15/0018* (2013.01); *B61L 23/041* (2013.01); *B61L 23/042* (2013.01); *B61L 23/34* (2013.01); *B61L 25/021* (2013.01); *B61L 25/025* (2013.01); *B61L 27/0011* (2013.01); *B61L 27/0077* (2013.01); *G01C 21/00* (2013.01); *G05D 1/0088* (2013.01); *G05D 1/0246* (2013.01); *G05D 1/0257* (2013.01); *G05D 1/0259* (2013.01); *G05D 1/0276* (2013.01); *G05D 1/0287* (2013.01);
(Continued)

(58) Field of Classification Search
CPC .... B61L 27/04; B61L 15/0018; B61L 23/041; B61L 23/042; B61L 23/34; B61L 25/021; B61L 25/025; B61L 27/0011; B61L 27/0077; B61L 2201/02; B61L 2201/00; G01C 21/00; G05D 1/0088; G05D 1/0246; G05D 1/0257; G05D 1/0259; G05D 1/0276; G05D 1/0287; G05D 2201/0212
USPC ........................................................ 701/20
See application file for complete search history.

(56) References Cited

U.S. PATENT DOCUMENTS 6,163,755 A * 12/2000 Peer ...................... B61L 23/041
                                                      340/436
9,582,003 B1    2/2017 Levandowski et al.
(Continued)

FOREIGN PATENT DOCUMENTS

KR     20160066854 A    6/2016

OTHER PUBLICATIONS

PCT International Search Report for Application No. PCT/US2019/017527, dated May 30, 2019.

*Primary Examiner* — Marthe Y Marc-Coleman
(74) *Attorney, Agent, or Firm* — Richard T. Ogawa; Ogawa P.C.

(57) ABSTRACT

An Automous vehicle ("AV") is configured on a railway system. The AV can be configured among the other vehicles and railway to communicate with a rider on a peer to peer basis to pick up the rider on demand, rather than the rider being held hostage to a fixed railway schedule. The rider can have an application on his/her cell phone, which tracks each of the AVs, and contact them using the application on the cell phone.

23 Claims, 6 Drawing Sheets

(51) Int. Cl.
*B61L 27/00* (2006.01)
*G05D 5/00* (2006.01)
*G05D 1/02* (2020.01)
*G05D 21/00* (2006.01)
*B61L 15/00* (2006.01)
*B61L 23/34* (2006.01)
*B61L 23/04* (2006.01)
*G05D 1/00* (2006.01)
*G01C 21/00* (2006.01)

(52) U.S. Cl.
CPC ....... *B61L 2201/00* (2013.01); *B61L 2210/02* (2013.01); *G05D 2201/0212* (2013.01)

(56) References Cited

U.S. PATENT DOCUMENTS

| | | |
|---|---|---|
| 9,603,158 B1 | 3/2017 | Ross et al. |
| 9,616,896 B1 | 4/2017 | Letwin et al. |
| 9,672,446 B1 | 6/2017 | Vallespi-Gonzalez |
| 9,740,205 B2 | 8/2017 | Ross et al. |
| 9,811,086 B1 | 11/2017 | Poeppel et al. |
| 9,840,256 B1 | 12/2017 | Valois |
| 9,841,763 B1 | 12/2017 | Valois |
| 2015/0339928 A1 | 11/2015 | Ramanujam |
| 2017/0277186 A1 | 9/2017 | Ross et al. |
| 2018/0032075 A1 | 2/2018 | Valois |

\* cited by examiner

US 10,618,537 B2

AUTONOMOUS RAIL OR OFF RAIL VEHICLE MOVEMENT AND SYSTEM AMONG A GROUP OF VEHICLES

CROSS-REFERENCE TO RELATED APPLICATIONS

This application is a continuation in part of U.S. application Ser. No. 15/959,077 filed Apr. 20, 2018, which is a continuation in part of U.S. application Ser. No. 15/894,783 filed on Feb. 12, 2018, which are herein incorporated by reference in their entirety.

BACKGROUND

The present invention relates to techniques, including a method, and system, for movement of an autonomous vehicle on a track system like a railway, tram or other track among a plurality of vehicles using a combination of sensing and artificial intelligence techniques to monitor, detect, and act on activities or on another adjacent system configured with the track system. In an example, management of such vehicle can be from both active and passive sensors, among others and on vehicle or stationary sensors along the track. Merely by way of examples, various applications can include daily life, and others.

Motor vehicles have greatly progressed from the early days in the late 1880's by Karl Benz with gasoline-powered engines, then in 1908 by the introduction of the Model T by Henry Ford and the Ford Motor Company, and most recently with electric cars manufactured by Tesla, Inc. of Palo Alto. Most recently, automated or autonomous vehicles (AVs) have been introduced with continuous, or near continuous, sensor data gathering and processing in order to operate safely through real-world environments for passenger service on public or private roads. In doing so, many AVs include sensor arrays that have multiple sensor systems. For example, AV sensor arrays can include any number of active sensor systems, such as electromagnetic signal ranging and detection systems (e.g., radar and LiDAR systems). The AV sensor arrays can also include passive sensor systems, such as stereo camera systems or proximity sensors. In order for the AV to operate safely and reliably, the quality (e.g., the signal to noise ratio) of the sensor data collected by these sensor systems may be crucial.

Although motor vehicles have progressed, we still face limitations with the basic technology of vehicles configured for tracks, which are known as trains, trams or other vehicles.

SUMMARY

According to the present invention, techniques related to a method, and system, for movement of an autonomous vehicle providing public or private transport to passengers or freight on a track system among a plurality of vehicles or on another adjacent system configured with the railway system are provided, for example a adjacent road system, where transit may or may not be autonomous. In particular, the invention can use a combination of sensing and artificial intelligence techniques to monitor, detect, and act on activities are provided. In an example, management of such vehicle can be from both active and passive sensors, among others. Merely by way of examples, various applications can include daily life, and others.

In an example, the autonomous vehicle ("AV") can be configured among the other vehicles and railway to communicate with a rider on a peer-to-peer basis to pick up the rider on demand, as illustrated in FIG. 1, rather than the rider being held hostage to a fixed service schedule. The rider can have an application on his/her cell phone, which tracks each of the AVs, and contact them or a central dispatch service using the application on the cell phone or other mobile device like a laptop.

In an example, the method includes initiating movement of the autonomous vehicle configured in a rail of the railway system. In an example, the autonomous vehicle comprises a sensor array system configured spatially on the autonomous vehicle (AV). In an example, the sensor array system comprises a plurality of active sensor systems, among other elements. The active sensor systems can have at least one processor device coupled to the sensor array system. The systems can include a memory device coupled to the processing device. The system may communicate with other autonomous vehicles or stationary devices alongside the track or road.

In an example, the memory has various instructions stored or burned into the memory. In an example, the memory has an instruction stored on the memory device. In an example, the instruction when executed by the processor causes the sensor array system to, as the AV travels a current route on the rail of the railway track system or other similar track system, dynamically detect a reflectance of an event from a plurality of events, or other entities to provide safe autonomous transport. In an example, the event can be selected from an anomaly, a stationary feature, or a location of one of the other plurality of vehicles, among other detectable events. Other instructions can also be included.

In an example, the method also includes using data from the reflectance (e.g., sensor feedback) of the event or the plurality of events to adjust a movement of the AV in relationship to the event, while the AV is mechanically disconnected from the plurality of vehicles configured on the rail of the railway system.

In an example, the present system is configured to create a on demand schedule, rather than a fixed schedule often present in a railway, or pod, or track system made economic by autonomous navigation on and off the tracks.

In an alternative example, the method further comprises moving the AV to an adjacent system configured with the rail, the adjacent system comprising at least one of a roadway, a waterway, airway, or any combination thereof, such that the processor device coupled to the sensor array system executes an instruction stored on the memory device causing the sensor array system to, as the AV travels a current route on the adjacent system, dynamically detect a reflectance of an event from a plurality of events, the event being selected from an anomaly, a stationary feature, or a location of one of the other plurality of vehicles. In an example, the method using data from the reflectance of the event or the plurality of events to adjust a movement of the AV in relationship to the event, while the AV is mechanically disconnected from the rail of the railway system.

In an example, any one of the examples can include a safety process to transport passengers or freight along the track or railway system by detecting events that can lead to an unsafe event for the passenger or freight or other objects such as cars in a cross-road.

In an example and modification to the above system, a first instruction is stored on the memory device. In an example, the first instruction when executed by the processor causes the sensor array system to, as the AV travels a current route on a rail of the railway track system, dynamically detect a reflectance of an event from a plurality of events, which is selected from an anomaly, a stationary feature, or a location of one of the other plurality of vehicles, autonomous or otherwise.

In an example and modification to the above system, a second instruction is stored on the memory device. In an example, the second instruction when executed by the processor causes the sensor array system to, as the AV travels a current route on the other system, dynamically detect a reflectance of an event from a plurality of events, the event being selected from an anomaly, a stationary feature, or a location of one of the other plurality of vehicles.

In an example, the present invention provides a method for moving an autonomous vehicle among a plurality of vehicles configured on a track system or an adjacent interacting systems consisting of a roadway, a waterway, or any combination thereof. The method includes initiating movement of the autonomous vehicle configured in a track of the track system or configured on the adjacent interacting system. The autonomous vehicle comprises a sensor array system configured spatially on the autonomous vehicle (AV). The sensor array system comprises a plurality of active sensor systems; at least one processor device coupled to the sensor array system; a memory device coupled to the processing device; an instruction stored on the memory device, the instruction when executed by the processor causes the sensor array system to, as the AV travels a current route on the rail of the railway track system or the adjacent interacting system, dynamically detect a reflectance of an event from a plurality of events, the event being selected from an anomaly, a stationary feature, or a location of one of the other plurality of vehicles and the vehicle appropriately modifies its behavior. The method includes using data from the reflectance of the event or the plurality of events to adjust a movement of the AV in relationship to the event.

Further details of the present method and associated systems can be found throughout the present specification and more particularly below.

The above examples and implementations are not necessarily inclusive or exclusive of each other and may be combined in any manner that is non-conflicting and otherwise possible, whether they be presented in association with a same, or a different, embodiment or example or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above examples implementations are illustrative, rather than limiting. Tracks of all types are intended to be covered as are all vehicles of all types and sizes.

DETAILED DESCRIPTION OF THE EXAMPLES

According to the present invention, techniques related to a method, and system, for movement of an autonomous vehicle on a track system or on another adjacent system configured with the track system among a plurality of vehicles are provided. In particular, the invention can use a combination of sensing and artificial intelligence techniques to monitor, detect, and act on activities are provided. In an example, management of such vehicle can be from both active and passive sensors, among others. Merely by way of examples, various applications can include daily life, and others.

Figure 1:
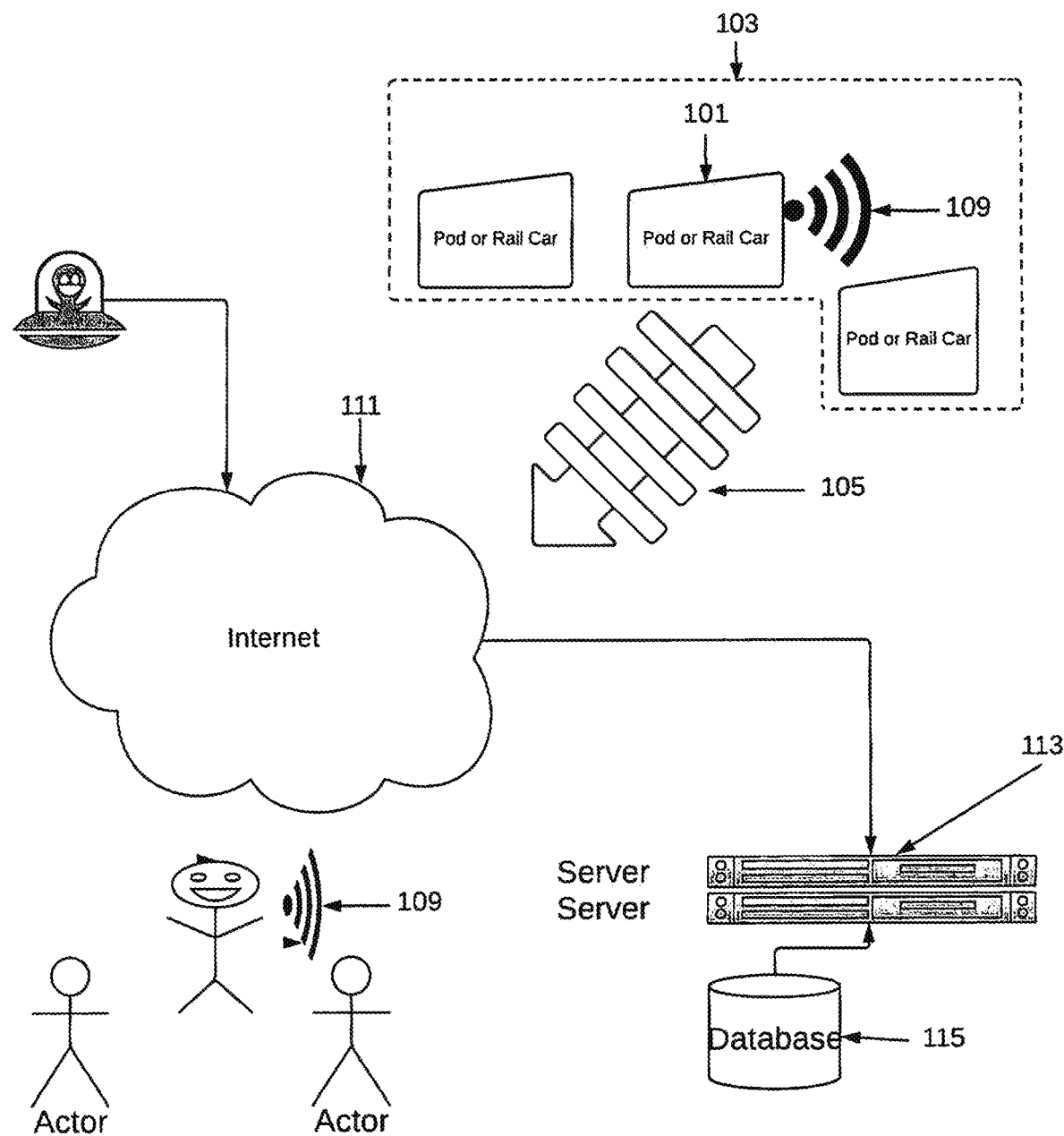
FIG. 1 is a simplified illustration of an autonomous railway system according to an example of the present invention.

In an example, the present invention provides a method for moving an autonomous vehicle 101 among a plurality of vehicles 103 configured on a railway track system 105, as shown in FIG. 1. In an example, the track system like a railway can be adjacent to another system integrated with the track system like a road system integrated with a railway. As shown, a rider 107 can contact the vehicle and call it using an application on a cell phone. In an example, the call is initiated, connected, and provided using a wireless transmission 109 technique, such as cellular, WiFi, or others. In an example, the communication can be routed through the Internet 111 and controlled under a plurality of servers 113 coupled to a memory resource. In an example, the memory resource 115 can include, among others, dynamic random access memory, read only memory, Flash memory, fixed memory, optical memory, and any combination of these. Of course, there can be other variations, modifications, and alternatives.

In an example, the vehicle can be a rail car, trolley, or other vehicle or movable entity on a fixed track or cable system, among others. In an example, each of the vehicles can have a human driver or more preferably can be operated without a human driver.

Figure 2:
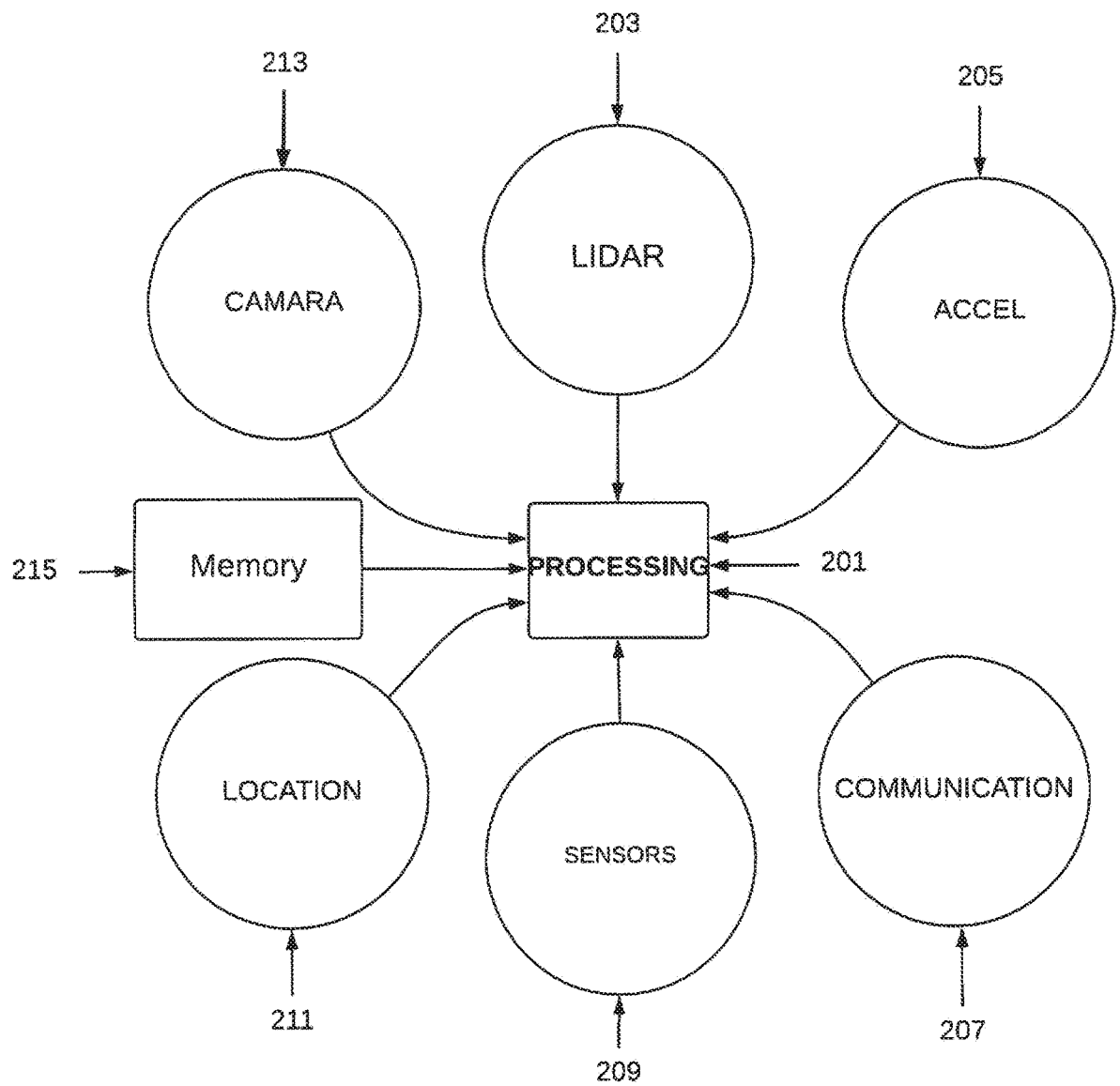
FIG. 2 is a simplified illustration of a system diagram of for each of the autonomous vehicles according to an example of the present invention.

In an example, the method includes initiating movement of the autonomous vehicle configured in a rail of the railway system. In an example, the autonomous vehicle comprises a sensor array system, as shown in FIG. 2, configured spatially on the autonomous vehicle (AV). In an example, the sensor array system comprises a plurality of active sensor systems, among other elements. The active sensor systems can have at least one processor device 201 coupled to the sensor array system 203, 205, 209, 211. The array has a camera or imaging capture device, a LiDAR (to be explained in more detail below), an accelerometer (or gyro or both), a location sensor, such as a Global Positioning Sensor, and other sensor devices. The systems can include a memory device 215 coupled to the processing device. The system also has a communication interface 207 and communication devices. Such interface and devices can include, among others, a variety of techniques such as Bluetooth, WiFi, cellular (e.g., LTE, 5G), among other wireless techniques, and wired techniques such as Ethernet, Cable, and others, including combinations thereof.

In an example, the memory device can be one or more memories including a fixed disk memory, a Flash memory, a dynamic random access memory, or other memory resources. In an example, the memory has various instructions stored or burned into the memory. In an example, the memory has an instruction stored on the memory device. In an example, the instruction when executed by the processor causes the sensor array system to, as the AV travels a current route on the rail of the railway track system, dynamically detect a reflectance of an event from a plurality of events, or other entities. In an example, the event can be selected from an anomaly, a stationary feature, or a location of one of the other plurality of vehicles, among other detectable events. Other instructions can also be included.

In an example, the method also includes using data from the reflectance of the event or the plurality of events to adjust a movement of the AV in relationship to the event, while the AV is mechanically disconnected from the plurality of vehicles configured on the rail of the railway system.

In an example, the method also includes monitoring each of the AVs using a central database in real time, while collecting information associated each AVs in the central database. In an example, the central data can be used for scheduling, tracking, and monitoring, however, such database may or may not be used for autonomous navigation in an example.

In an example, the AV further comprises a relationship table comprising a plurality of sensor configurations for each respective one of a plurality of active sensor systems included in the sensor array system. Of course, the sensor configurations can be stored using other techniques. The plurality of sensor configurations can be adjusted within a time frame at least one output sensor configuration for the sensor array to identify the event using the detected reflectance of the event. In an example, the plurality of sensor configurations can also provide an output to influence movement of the AV based upon the detected reflectance and identified event as the AV travels the current route.

Figure 3:
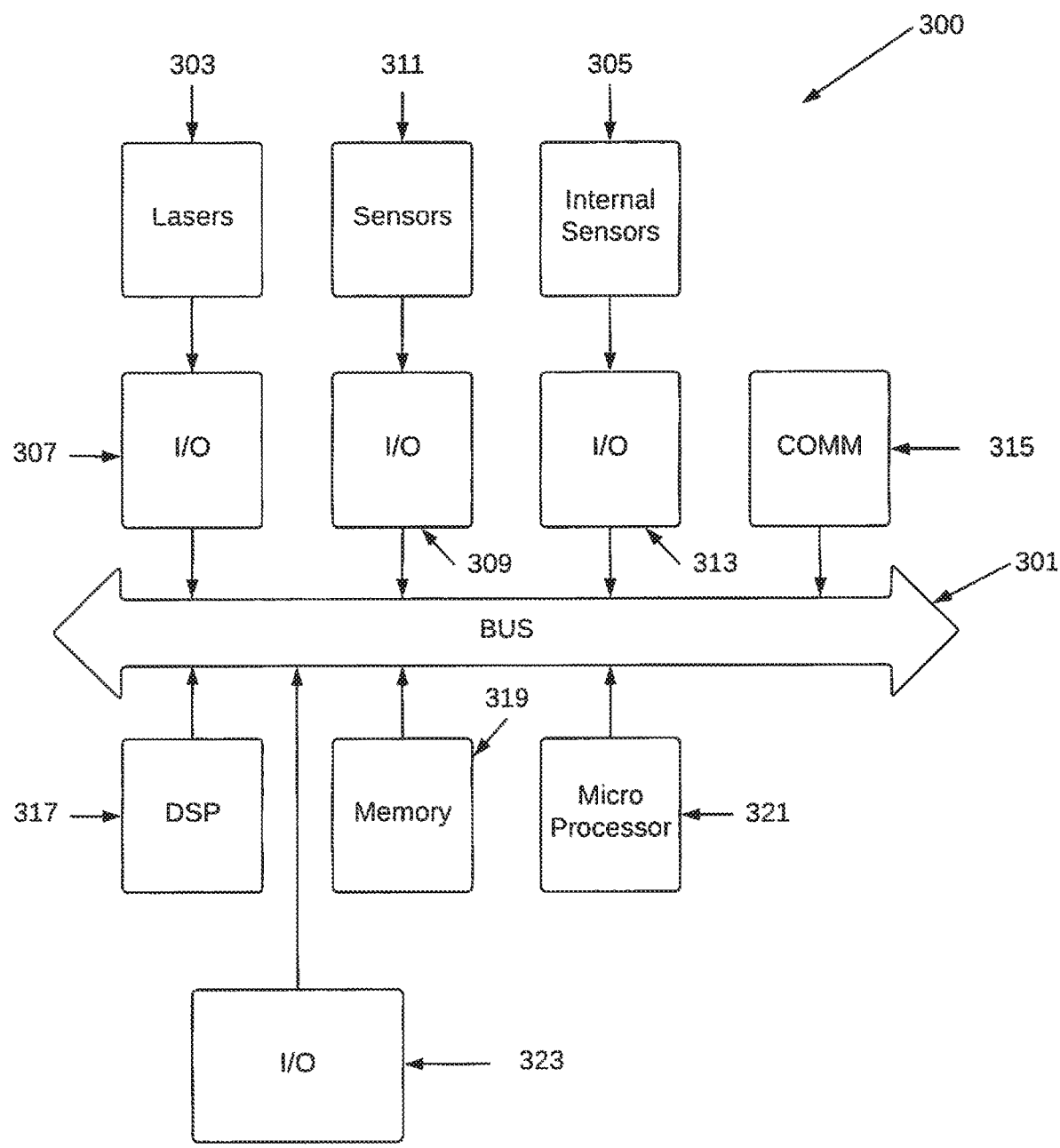
FIG. 3 is a simplified illustration of a LIDAR system according to an example of the present invention.

Depending upon the example, sensor array system comprises a light-detection and ranging (LiDAR) system as shown in FIG. 3, or other system suitable for transmitting a signal and receiving a reflection with accuracy. In an example, the output sensor configuration configures one or more of a scan rate of the LiDAR system, a photodetector sensitivity of the LiDAR system, or a laser power level of the LiDAR system. Of course, there can be other variations, modifications, and alternatives.

An example of a LiDAR system can be found in U.S. Pat. No. 7,969,558 in the name of Hall issued Jun. 28, 2011, and titled "High Definition Lidar System," which is incorporated by reference herein, in its entirety for all purposes. In an example, the system 300 has a common bus 301. Various components include a plurality of input/output interfaces 307, 309, 313. Each of the interfaces can include an analog front end, including a filter. In an example, the system has a plurality of lasers 303. It should be noted that other detection techniques can be used such as radar, cameras, combinations of these, and the like.

In an example, the system has a plurality of external sensors 311 configured to receive feedback from a reflection from an entity from one or more of the lasers. In an example, the system has a plurality of internal sensors 305 for adjusting or providing compensation for the plurality of external sensors from movement of the LiDAR system. In an example, the system has a communication interface 315, which can include a physical connection, wireless connection, or an optical connection. Other elements include a memory resource 319, digital signal processor, DSP 317, and optionally a micro-processor device 321. The system also has a common interface for an input/output interface 323, as shown.

In an example, the LiDAR (or Laser Imaging Detection and Ranging) terrain mapping and obstacle detection system employed as a sensor for an autonomous vehicle. The system includes 8 assemblies of 8 lasers each or 2 assemblies of 32 lasers each forming a 64-element LiDAR system, although there can be variations. The system has a 360-degree horizontal field of view (FOV) and a 26.8-degree vertical FOV. The system is typically mounted on the top center of a vehicle, giving it a clear view in all directions, and rotates at a rate of up to 200 Hz, thereby providing a high point cloud refresh rate, such high rate being necessary for autonomous navigation at higher speeds. At this configuration, the system can collect approximately 1 million time of flight (TOF) distance points per second. The system provides the unique combination of 360 degree FOV, high point cloud density, and high refresh rate. The standard deviation of TOF measurements is equal to or less than 5 centimeters. The system has an inertial navigation system (INS) sensor system mounted on it to report exact pitch and roll of the unit that is used by navigational computers to correct for these deviations. The unit generates its own light and uses a proprietary filter to reject sunlight, so it works well under all lighting and most weather conditions. Through the use of digital signal processor (DSP) control, a dynamic power feature allows the system to increase the intensity of the laser emitters if a clear terrain reflection is not obtained by photo detectors (whether due to reflective surface, weather, or other reasons), and to reduce power to the laser emitters for safety reasons if a strong reflection signal is detected by photo detectors. A direct benefit of this feature is that the system is capable of seeing through fog and heavy rain by increasing laser power dynamically and ignoring early reflections. The unit also has the capability to receive and decipher multiple returns from a single laser emission through digitization and analysis of the waveform generated by the detector as the signal generated from the emitter returns.

In an example, the system sends data in the form of range and intensity information via Ethernet output (or similar output) to a master navigational system. Using standard trigonometry, the range data is converted into x and y coordinates and a height value. The height value is corrected for the vehicle's pitch and roll so the resulting map is with reference to the horizontal plane of the vehicle. The map is then "moved" in concert with the vehicle's forward or turning motion. Thus, the sensor's input is cumulative and forms an ultra-high-density profile map of the surrounding environment.

In an example, the highly detailed terrain map is then used to calculate obstacle avoidance vectors if required and, as importantly, determine the maximum allowable speed given the terrain ahead. The system identifies of size and distance of objects in view, including the vertical position and contour of a road surface. The anticipated offset of the vehicle from a straight, level path, either vertical or horizontal, at different distances is translated into the G-force that the vehicle will be subject to when following the proposed path at the current speed. That information can be used to determine the maximum speed that the vehicle should be traveling, and acceleration or braking commands are issued accordingly. In all cases the software seeks the best available road surface or track system (and thus the best possible speed) still within the boundaries of a global positioning system (GPS) waypoint being traversed. Further details of an example of a system can be found in the aforementioned U.S. patent, among others. Of course, there can be other variations, modifications, and alternatives.

In an example, the sensor array system comprises a radar system. In an example, the output sensor configuration configures a pulse width of a carrier signal of the radar system. In an example, each of the plurality of active sensor systems emit one or more of sounds waves or electromagnetic waves.

In one example, the executed instruction causes the system to dynamically determine the one or more output sensor configurations by performing a lookup in the relationship table based on a reflectance of each of the detected reflectance events.

In an example, the executed instruction cause the system to dynamically determine the one or more output sensor configurations by performing an optimization utilizing a plurality of possible configurations for each of the plurality of active sensor systems based on a reflectance of each of the detected reflectance events by identifying a surface feature of each of the events. The optimization uses a fitting function to converge on the one or more sensor output configurations in the relationship table. Again, there can be other variations, modifications, and alternatives.

In an example, the present invention provides the plurality of active sensor systems that comprise a LiDAR system and a radar system. In an example, the sensor array further includes a plurality of passive sensor systems that detect reflected natural light. In an example, both passive and active sensor systems are included.

In an example, the at least one of passive sensor systems of the sensor array comprise a stereo camera system. The stereo camera system records and captures both images and audio.

In an example, the LiDAR system, the radar system, and the stereo camera system each provides sensor data to a control system of the AV to enable the AV to maneuver along the current route and initiate adjustment of the movement of the AV along the track.

In an example, the control system dynamically processes data from the sensor array system to increase speed, reduce speed, or stop the AV along the current route or wherein the control system interfaces with the central database to increase speed, reduce speed, or stop the AV along the current route. The detected reflectance events can comprise one or more surface features of an environment around the AV and one or more weather features indicating precipitation.

In an example, the executed instruction further causes the predictive sensor array configuration system to: in response to identifying the weather features indicating precipitation, deprioritize sensor data from the LiDAR system for processing by the control system. Of course, there can be other variations. Additionally, the executed instruction further causes the system to: in response to identifying the weather features indicating precipitation, deactivate the LiDAR system. The executed instruction causes the system to dynamically identify the one or more reflectance events by receiving reflectance data from a number of proximate AVs traveling on the current route on the railway system. In other examples, the executed instruction causes the system to receive the reflectance data from the proximate AVs by establishing a mesh network with the proximate AVs on the railway system or other entities that are not AVs. In an example, the executed instruction further causes the system to: maintain a sub-map database comprising 3D surface data of an operational region of the AV on the railway system; and identify, using a current position of the AV, a correlated sub-map from the sub-map database that provides 3D surface data surrounding the current position of the AV; wherein the executed instruction causes the system to dynamically identify the reflectance events that affect detectability by the sensor array from the 3D surface data provided by the correlated sub-map.

In an example, the system can also have a variety of stationary features. In an example, the stationary feature can be one or more of a railway sign, a railway station, a railway track, a vehicle roadway, a railway crossing, or other fixture, among other things. In an example, the stationary feature can also be the location of one of the other plurality of vehicles comprising a distance between the other vehicle and the AV, the anomaly being one or more of a human being, a dog, a cat, a horse, cattle, a moving vehicle crossing the railway track, a weather condition, or a defect on the railway track. In an example, the stationary feature can also be movable or moving.

Figure 4:
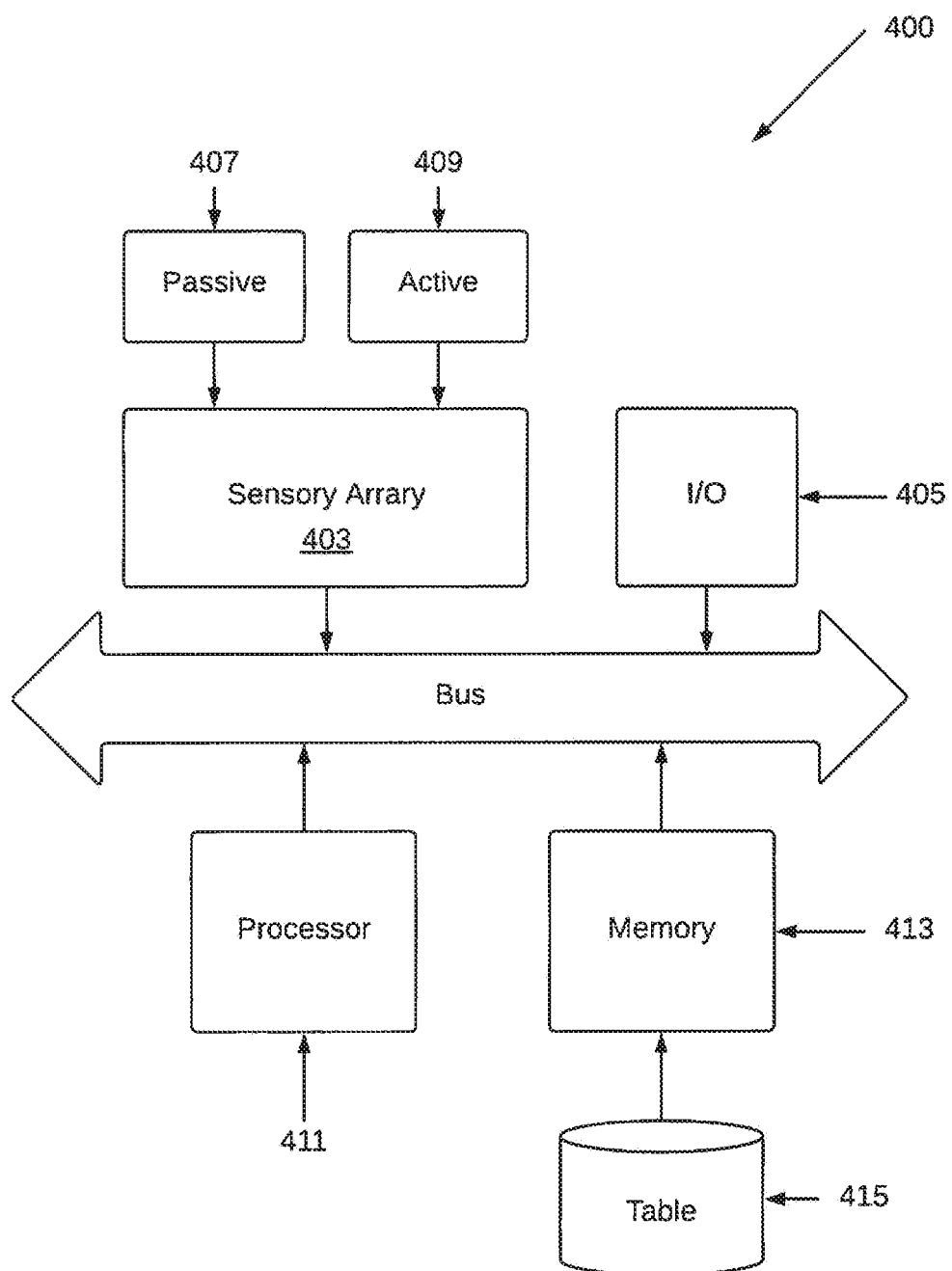
FIG. 4 is a simplified illustration of a sensor array according to an example of the present invention.
Figure 5:
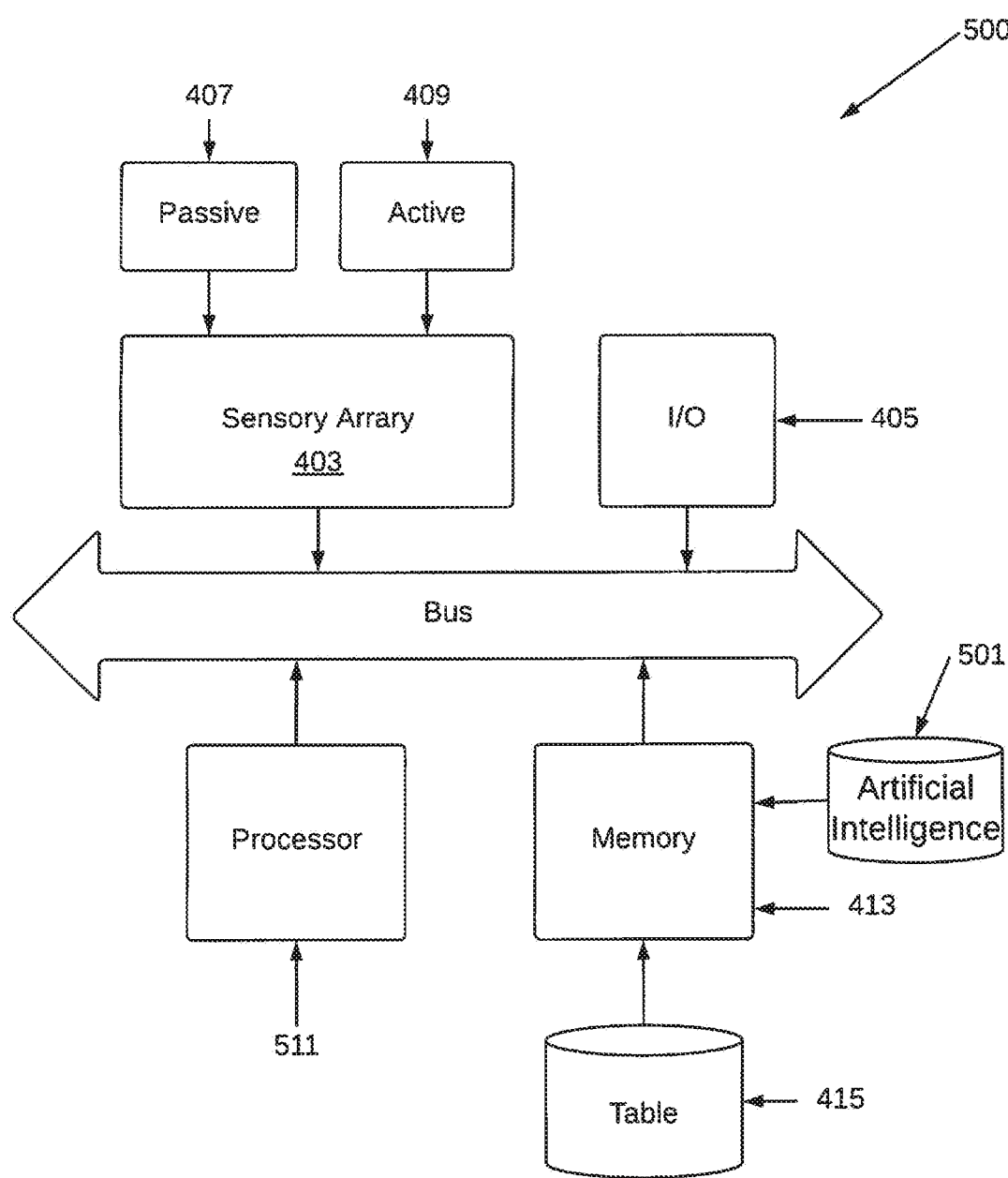
FIG. 5 is a simplified illustration of a sensor array according to an alternative example of the present invention.

In an example, FIG. 4 is a simplified illustration of a sensor array according to an example of the present invention. In an alternative example, FIG. 5 is a simplified illustration of a sensor array according to the alternative example of the present invention. In an example, each of the systems 400, 500 is for adjusting movement of an autonomous vehicle among a plurality of vehicles configured on a railway track system.

In an example, the system has a sensor array system configured spatially on the autonomous vehicle (AV). In an example, the sensor array system 403 comprises a plurality of active sensor systems 409 and a plurality of passive sensor systems 407. In an example, at least one processor device 411 is coupled to the sensor array system through a common bus. The system also has a memory device 413 coupled to the processing device using the bus.

Various instructions can be stored in the memory device or other memory resources. In an example, the system has an instruction stored on the memory device. In an example, the instruction when executed by the processor causes the sensor array system to, as the AV travels a current route on a rail of the railway track system, dynamically detect a reflectance of an event from a plurality of events, the event being selected from an anomaly, a stationary feature, or a location of one of the other plurality of vehicles.

In an example, the system has a relationship table 415 comprising a plurality of sensor configurations for each respective one of a plurality of active sensor systems included in the sensor array system to adjust within a time frame at least one output sensor configuration for the sensor array to identify the event using the detected reflectance of the event. In an example, the system also has an output interface 405. In an example, the system has an output interface to transmit an output to influence movement of the AV based upon the detected reflectance and identified event as the AV travels the current route. Of course, there can be other variations, modifications, and alternatives.

Referring now to FIG. 5, the system includes a variety of common elements of FIG. 4, which may be combined, replaced, or modified, in one or more examples. As shown, the system has a sensor array system configured spatially on the autonomous vehicle (AV). In an example, the sensor array system 403 comprises a plurality of active sensor systems 409 and a plurality of passive sensor systems 407. In an example, at least one processor device, such as a graphical processing unit 511, is coupled to the sensor array system through a common bus. In an example, the graphical processing unit can bean NVIDIA DRIVE™ PX, which is the artificial intelligence ("AI") car computer that enables automakers, truck makers, tier 1 suppliers, and startups to accelerate production of automated and autonomous vehicles. In an example, the unit scales from a single processor configuration delivering an auto cruise capabilities, to a combination of multiple processors and discrete GPUs designed to drive fully autonomous robot axis. Of course, the architecture is available in a variety of configurations ranging from one passively cooled mobile processor operating at 10 watts, to a multi-chip configuration with four high performance AI processors—delivering 320 trillion deep learning operations per second (TOPS)—that enable Level 5 autonomous driving.

In an example, the NVIDIA DRIVE PX platform combines deep learning, sensor fusion, and surround vision to change the driving experience. The platform is capable of understanding in real-time what's happening around the vehicle, precisely locating itself on an HD map, and planning a safe path forward. Designed around a diverse and redundant system architecture, the NVIDIA DRIVE PX platform is built to support ASIL-D, the highest level of automotive functional safety. Further details of the platform from NVIDIA can be found at www.nvidia.com.

The system also has a memory device 413 coupled to the processing device using the bus or other interface device. Various instructions can be stored in the memory device or other memory resources. In an example, the system has an instruction stored on the memory device. In an example, the instruction when executed by the processor causes the sensor array system to, as the AV travels a current route on a rail of the railway track system, dynamically detect a reflectance of an event from a plurality of events, the event being selected from an anomaly, a stationary feature, or a location of one of the other plurality of vehicles.

In an example, the system has a relationship table 415 comprising a plurality of sensor configurations for each respective one of a plurality of active sensor systems included in the sensor array system to adjust within a time frame at least one output sensor configuration for the sensor array to identify the event using the detected reflectance of the event. In an example, the system also has an output interface 405. In an example, the system has an output interface to transmit an output to influence movement of the AV based upon the detected reflectance and identified event as the AV travels the current route. Of course, there can be other variations, modifications, and alternatives.

In an example, the system also has an artificial intelligence module 501 and a graphical processing unit 511. The artificial intelligence module is a neural net based process having a plurality of nodes, numbered from 1 to N, where N is an integer greater than 100 or even 1,000,000, among other variations. In an example, the graphical processing unit, can be one from Nvidia Corporation from California, among others.

Figure 6:
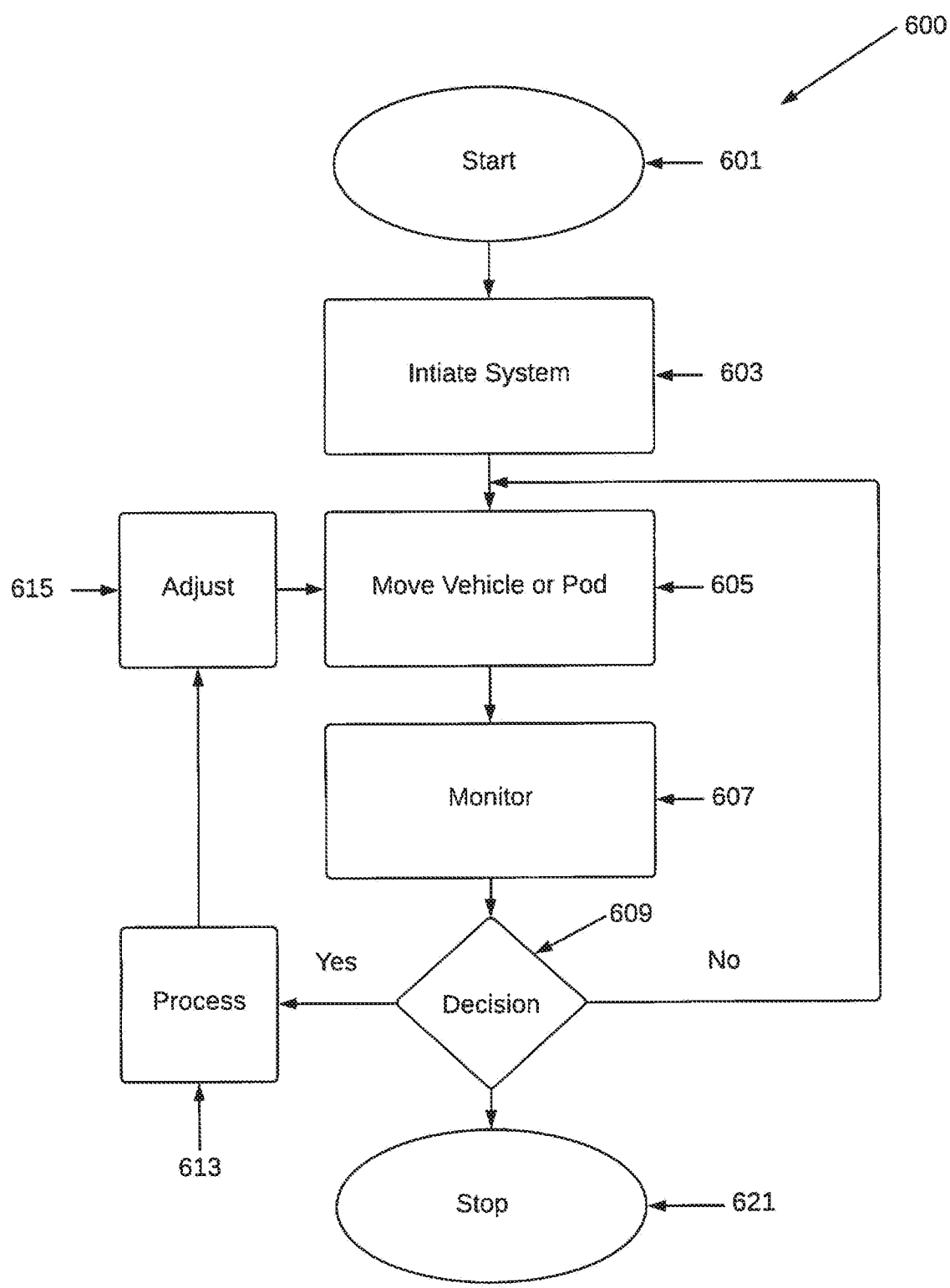
FIG. 6 is a simplified flow diagram of a method according to an example of the present invention.

Referring to FIG. 6, the present invention provides a simplified illustration 600 of a method for moving an autonomous vehicle among a plurality of vehicles configured on a railway track system. As shown, the method begins with start, 601. In an example, the method includes initiating 603 movement of the autonomous vehicle configured in a rail of the railway system. In an example the vehicle begins movement 605 on the track or other rail system. The method then begins monitoring 607 a plurality of parameters using a sensor array system, which has been described, and will be further describe below.

In an example, the autonomous vehicle comprising a sensor array system configured spatially on the autonomous vehicle (AV). In an example, the sensor array system comprises a plurality of active sensor systems. The system has at least one processor device coupled to the sensor array system. The system has a memory device coupled to the processing device. The system also has an instruction stored on the memory device, the instruction when executed by the processor causes the sensor array system to, as the AV travels a current route on the rail of the railway track system, dynamically detect a reflectance of an event from a plurality of events, the event being selected from an anomaly, a stationary feature, or a location of one of the other plurality of vehicles. In an example, the system continues to monitor one or more events until a decision 609 is made as described below. As shown, the system has a "YES" branch to process 613, and a "NO" branch that points back to a step after initiation to restart the method in an example.

As shown in this example, the method includes using data from the reflectance of the event or the plurality of events to adjust 615 a movement of the AV in relationship to the event once the data has been processed 613, while the AV is mechanically disconnected from the plurality of vehicles configured on the rail of the railway system or the AV is mechanically connected to one or N−1 of the plurality of vehicles numbered from 2 to N.

In an example, the method includes using a light-detection and ranging (LiDAR) system included in the sensor array system. In an example, the LiDAR is configured with the output sensor configuration to adjust one or more of a scan rate of the LiDAR system, a photodetector sensitivity of the LiDAR system, or a laser power level of the LiDAR system.

The system has a relationship table comprising a plurality of sensor configurations for each respective one of a plurality of active sensor systems included in the sensor array system to adjust within a time frame at least one output sensor configuration for the sensor array to conclusively identify the event using the detected reflectance of the event. The system also has an output to influence movement of the AV based upon the detected reflectance and identified event as the AV travels the current route. The system has a control system coupled to the processor to dynamically processes data from the output derived from the sensor array system to increase speed, reduce speed, or stop the AV along the current route. As shown, the system also includes a stop step, 621.

In an example, the railway system can be selected from a rail road system, a trolley system, or other rail or fixed route system using a rail or cables. Of course, there an be other variations, modifications, and alternatives.

In an example, sensor array system comprises a light-detection and ranging (LiDAR) system. In an example, the output sensor configuration configures one or more of a scan rate of the LiDAR system, a photodetector sensitivity of the LiDAR system, or a laser power level of the LiDAR system.

In an example, the sensor array system comprises a radar system. In an example, the output sensor configuration configures a pulse width of a carrier signal of the radar system. In an example, each of the plurality of active sensor systems emit one or more of sounds waves or electromagnetic waves.

In an example, the system executed various instructions to adjust movement of the vehicle. In an example, the executed instruction causes the system to dynamically determine the one or more output sensor configurations by performing a lookup in the relationship table based on a reflectance of each of the detected reflectance events. In an example, the executed instruction cause the system to dynamically determine the one or more output sensor configurations by performing an optimization utilizing a plurality of possible configurations for each of the plurality of active sensor systems based on a reflectance of each of the detected reflectance events by identifying a surface feature of each of the events, and wherein the optimization uses a fitting function to converge on the one or more sensor output configurations in the relationship table.

In other examples, the plurality of active sensor systems comprise a LiDAR system and a radar system. In an example, the sensor array further includes a plurality of passive sensor systems that detect reflected natural light. In an example, at least one of passive sensor systems of the sensor array comprises a stereo camera system. In an example, the LiDAR system, the radar system, and the stereo camera system each provides sensor data to a control system of the AV to enable the AV to maneuver along the current route and initiate adjustment of the movement of the AV along the track.

In an example, the control system dynamically processes data from the sensor array system to increase speed, reduce speed, or stop the AV along the current route.

In other examples, the detected reflectance events comprise one or more surface features of an environment around the AV and one or more weather features indicating precipitation. In an example, the executed instruction further causes the predictive sensor array configuration system to: in response to identifying the weather features indicating precipitation, deprioritize sensor data from the LiDAR system for processing by the control system. In an example, the executed instruction further causes the system to: in response to identifying the weather features indicating precipitation, deactivate the LiDAR system. In an example, the executed instruction causes the system to dynamically identify the one or more reflectance events by receiving reflectance data from a number of proximate AVs traveling on the current route on the railway system.

In an example, the executed instruction causes the system to receive the reflectance data from the proximate AVs by establishing a mesh network with the proximate AVs on the railway system. In an example, the executed instruction further causes the system to: maintain a sub-map database comprising 3D surface data of an operational region of the AV on the railway system; and identify, using a current position of the AV, a correlated sub-map from the sub-map database that provides 3D surface data surrounding the current position of the AV. In an example, the executed instruction causes the system to dynamically identify the reflectance events that affect detectability by the sensor array from the 3D surface data provided by the correlated sub-map.

In an example, the stationary feature being one or more of a railway sign, a railway station, a railway track, a vehicle roadway, a railway crossing, or other fixture, the location of one of the other plurality of vehicles comprising a distance between the other vehicle and the AV, the anomaly being one or more of a human being, a dog, a cat, a horse, cattle, a moving vehicle crossing the railway track, a weather condition, or a defect on the railway track. Of course, there can be other variations, modifications, and alternatives.

Having described various embodiments, examples, and implementations, it should be apparent to those skilled in the relevant art that the foregoing is illustrative only and not limiting, having been presented by way of example only. Many other schemes for distributing functions among the various functional elements of the illustrated embodiment or example are possible. The functions of any element may be carried out in various ways in alternative embodiments or examples.

Also, the functions of several elements may, in alternative embodiments or examples, be carried out by fewer, or a single, element. Similarly, in some embodiments, any functional element may perform fewer, or different, operations than those described with respect to the illustrated embodiment or example. Also, functional elements shown as distinct for purposes of illustration may be incorporated within other functional elements in a particular implementation. Also, the sequencing of functions or portions of functions generally may be altered. Certain functional elements, files, data structures, and so one may be described in the illustrated embodiments as located in system memory of a particular or hub. In other embodiments, however, they may be located on, or distributed across, systems or other platforms that are co-located and/or remote from each other. For example, any one or more of data files or data structures described as co-located on and "local" to a server or other computer may be located in a computer system or systems remote from the server. In addition, it will be understood by those skilled in the relevant art that control and data flows between and among functional elements and various data structures may vary in many ways from the control and data flows described above or in documents incorporated by reference herein. More particularly, intermediary functional elements may direct control or data flows, and the functions of various elements may be combined, divided, or otherwise rearranged to allow parallel processing or for other reasons. Also, intermediate data structures of files may be used and various described data structures of files may be combined or otherwise arranged.

In other examples, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

In an example, the present invention provides for each of the autonomous vehicle to be linked or unlinked among other vehicles.

In an example, the present invention provides for initiating an application in a mobile device, communicating the application with one of the plurality of vehicles on a track or off track. One of the vehicles is called and moves to a site of the use of the application. The vehicle can be on a track or off track.

In an example, the track can have a higher utilization rate using a combination of a regularly scheduled track or train system, and configured with an autonomous vehicle. In an example, the autonomous vehicle can be applied to a train track, a trolley track, a track for a commuter train such as the Bay Area Rapid Transit, commonly called "BART" or other scheduled vehicle on a track, and the like.

In an example, the application can be similar to one provided by UBER, which is centralized or decentralized. Of course, there can be other variations, modifications, and alternatives.

In an example, the autonomous vehicle can communicate with an external network to seek assistant.

Optionally, in an example, the autonomous vehicle can be configured for both on track and off track operation. In an example, a user can be picked up from an office in Menlo Park off Sand Hill Road, take the vehicle to a track such as those used by Caltrain, traverse through the San Francisco Bay Peninsula using the track and vehicle and then drive off the track onto a roadway in San Francisco to another office building, without the user stepping out of the vehicle. The vehicle can also traverse through any roadway, waterway, or other conventional vehicle way, while coupled to a track.

In an example, the system can include fixed sensors spatially and physically disposed along the track to communicate with the autonomous vehicle. In an example, the sensor can be placed near a crossing and transmit a signal indicating to the vehicle that the crossing exists. In an example, a pair of vehicles can have sensors that allow the vehicles to communicate with each other. Other specialized sensors can be placed near other tracks, vehicles, bridges, and other features.

Optionally, the vehicles can convoy with each other to maximize efficiency and safety of the vehicles. The convoy can be more efficient near a crossing or other element where the convoy is more efficiently manageable. Each of the vehicles can include an autonomous navigation system, including sensor, and can be coupled with each other in multiple units or groups for efficiency as they travel along a railway.

In an alternative example, the present invention provides a system for transporting a user or other article over a railway system. The system comprises a plurality of autonomous vehicles coupled to the railway system. In an example, each of the autonomous vehicles is capable of movement along the railway system on demand by a user of the autonomous vehicle. That is, a user can communicate with and call a particular vehicle, which will then move along the track to pick up the user. The vehicle will then drop off the user at a destination location along the railway system.

In an example, each of the autonomous vehicles comprises a pod or car comprising at least one to ten seating or standing regions, although there can be other configurations for articles, human users, or other entities to be transported. In an example, the pod is coupled to a drive train, the drive train being coupled to a track of the railway system.

In an example, the vehicle comprises a communication device comprising a transmitter and a receiver coupled to the autonomous vehicle. In an example, the communication device is capable of receiving an instruction from a user via a mobile communication device of the user to connect with the user through a communication network. In an example, the mobile device can be a cell phone, a tablet computer, or other computing device that is capable of communicating via a telephone network, local area network, or other network coupled to the Internet.

In an example, the vehicle has a controller device coupled to the communication device to initiate movement of the drive train of the autonomous vehicle to move the autonomous vehicle to pick up the user from a pickup location along the railway system and to move the autonomous vehicle, independently from the other plurality of autonomous vehicles, along the railway system to a destination location. The controller device comprises a micro controller and/or a micro-processor coupled to a bus coupled to a memory device. In an example, the controller can be programmed to carry out other functionality for the vehicle.

In an example, the autonomous vehicle comprising a sensor array system configured spatially on the autonomous vehicle (AV); at least one processor device coupled to the sensor array system; a memory device coupled to the processing device; an instruction stored on the memory device, the instruction when executed by the processor causes the sensor array system to, as the AV travels a current route on the rail of the railway system to dynamically detect a reflectance of an event from a plurality of events, the event being selected from an anomaly, a stationary feature, or a location of one of the other plurality of vehicles; and using data from the reflectance of the event or the plurality of events to adjust a movement of the AV in relationship to the event.

In an example, the drive train comprises a motor or engine coupled to a drive mechanism coupled to at least a pair of wheels, each of which is coupled to the track. The drive train can also be coupled to another transporting mechanism for cable cars, or other fixed path transport vehicles. Of course, there can be other variations, modifications, and alternatives.

In an example, each of the autonomous vehicles run along the railway system independent of the other autonomous vehicles, or run coupled to at least one or more other autonomous vehicles to form an autonomous train. That is, the vehicles, each of which is smaller in size than a conventional rail car, can convoy with each other to form a draft line for efficiency. The convoy can be a plurality of vehicles physically attached to each other or preferably coupled to each other via electronic control of each of the vehicles using the sensor array to keep a pair of vehicles from touching each other, while maintaining a desired distance to achieve minimal or improved wind resistance, and other efficiencies. Of course, there can be other variations, modifications, and alternatives.

Examples of processing techniques and systems can be found in U.S. Pat. No. 9,841,763 issued Dec. 12, 2017, and titled "Predictive Sensor Array Configuration System for an Autonomous Vehicle," which is incorporated by reference herein.

Examples of communication devices can be found in U.S. Pat. No. 9,432,929 issued Aug. 30, 2016, and titled "Communication configuration system for a fleet of automated vehicles," which is incorporated by reference herein.

Examples of vehicle management systems can be found in U.S. Pat. No. 9,811,086 issued Nov. 7, 2017, and titled "Vehicle management system," which is incorporated by reference herein.

The specification and drawings are, accordingly, to be regarded in an illustrative rather than a restrictive sense. It will, however, be evident that various modifications and changes may be made there unto without departing from the broader spirit and scope of the invention as set forth in the claims.

The invention claimed is:

1. A method for moving an autonomous vehicle among a plurality of vehicles configured on a railway track system, the method comprising:

initiating movement of the autonomous vehicle configured in a rail of the railway system or configured on the adjacent interacting system, the autonomous vehicle comprising a sensor array system configured spatially on the autonomous vehicle (AV), the sensor array system comprising a plurality of active sensor systems; at least one processor device coupled to the sensor array system; a memory device coupled to the processing device; an instruction stored on the memory device, the instruction when executed by the processor causes the sensor array system to, as the AV travels a current route on the rail of the railway track system or the adjacent interacting system, dynamically detect a reflectance of an event from a plurality of events, the event being selected from an anomaly, a stationary feature, or a location of one of a plurality of vehicles configured on the rail of the railway track system;

using data from the reflectance of the event or the plurality of events to adjust a movement of the AV in relationship to the event;

monitoring each of the AVs using a central database in real time, while collecting information associated each AVs in the central database; and using a cell phone to communicate with the AV to contact the AV for a pickup by a user before initiating movement of the AV configured on the rail of the railway track system.

2. The method of claim 1 wherein the AV further comprises: a relationship table comprising a plurality of sensor configurations for each respective one of a plurality of active sensor systems included in the sensor array system to adjust within a time frame at least one output sensor configuration for the sensor array to identify the event using the detected reflectance of the event; and an output to influence movement of the AV based upon the detected reflectance and identified event as the AV travels the current route.

3. The method of claim 2 wherein sensor array system comprises a light-detection and ranging (LiDAR) system, and wherein the output sensor configuration configures one or more of a scan rate of the LiDAR system, a photodetector sensitivity of the LiDAR system, or a laser power level of the LiDAR system.

4. The method of claim 2 wherein sensor array system comprises a radar system, and wherein the output sensor configuration configures a pulse width of a carrier signal of the radar system.

5. The method of claim 2 wherein each of the plurality of active sensor systems emit one or more of sounds waves or electromagnetic waves.

6. The method of claim 2 wherein the executed instruction causes the system to dynamically determine the one or more output sensor configurations by performing a lookup in the relationship table based on a reflectance of each of the detected reflectance events.

7. The method of claim 2 wherein the executed instruction cause the system to dynamically determine the one or more output sensor configurations by performing an optimization utilizing a plurality of possible configurations for each of the plurality of active sensor systems based on a reflectance of each of the detected reflectance events by identifying a surface feature of each of the events, and wherein the optimization uses a fitting function to converge on the one or more sensor output configurations in the relationship table.

8. The method of claim 2 wherein the plurality of active sensor systems comprise a LiDAR system and a radar system, and wherein the sensor array further includes a plurality of passive sensor systems that detect reflected natural light.

9. The method of claim 8 wherein the at least one of passive sensor systems of the sensor array comprise a stereo camera system.

10. The method of claim 9 wherein the LiDAR system, the radar system, and the stereo camera system each provides sensor data to a control system of the AV to enable the AV to maneuver along the current route and initiate adjustment of the movement of the AV along the track.

11. The method of claim 10 wherein the control system dynamically processes data from the sensor array system to increase speed, reduce speed, or stop the AV along the current route or wherein the control system interfaces with the central database to increase speed, reduce speed, or stop the AV along the current route.

12. The method of claim 11 wherein the detected reflectance events comprise one or more surface features of an environment around the AV and one or more weather features indicating precipitation.

13. The method of claim 12 wherein the executed instruction further causes the predictive sensor array configuration system to: in response to identifying the weather features indicating precipitation, deprioritize sensor data from the LiDAR system for processing by the control system.

14. The method of claim 12 wherein the executed instruction further causes the system to: in response to identifying the weather features indicating precipitation, deactivate the LiDAR system.

15. The method of claim 2 wherein the executed instruction causes the system to dynamically identify the one or more reflectance events by receiving reflectance data from a number of proximate AVs traveling on the current route on the railway system.

16. The method of claim 15 wherein the executed instruction causes the system to receive the reflectance data from the proximate AVs by establishing a mesh network with the proximate AVs on the railway system or other entities that are not AVs.

17. The method of claim 2 wherein the executed instruction further causes the system to: maintain a sub-map database comprising 3D surface data of an operational region of the AV on the railway system; and identify, using a current position of the AV, a correlated sub-map from the sub-map database that provides 3D surface data surrounding the current position of the AV; wherein the executed instruction causes the system to dynamically identify the reflectance events that affect detectability by the sensor array from the 3D surface data provided by the correlated sub-map.

18. The method of claim 2 wherein the stationary feature being one or more of a railway sign, a railway station, a railway track, a vehicle roadway, a railway crossing, or other fixture, the location of one of the other plurality of vehicles comprising a distance between the other vehicle and the AV, the anomaly being one or more of a human being, a dog, a cat, a horse, cattle, a moving vehicle crossing the railway track, a weather condition, or a defect on the railway track.

19. A method for initiating a call from a user using a network and moving an autonomous vehicle among a plurality of vehicles configured on a railway track system, the method comprising:

initiating movement of the autonomous vehicle configured in a rail of the railway system, the autonomous vehicle comprising a sensor array system configured spatially on the autonomous vehicle (AV), the sensor array system comprising a plurality of active sensor systems; at least one processor device coupled to the sensor array system; a memory device coupled to the processing device; an instruction stored on the memory device, the instruction when executed by the processor causes the sensor array system to, as the AV travels a current route on the rail of the railway track system, dynamically detect a reflectance of an event from a plurality of events, the event being selected from an anomaly, a stationary feature, or a location of one of a plurality of other vehicles; and using data from the reflectance of the event or the plurality of events to adjust a movement of the AV in relationship to the event.

20. A system for transporting a user or other article over a railway system, the system comprising:

a plurality of autonomous vehicles coupled to the railway system, each of the autonomous vehicles being capable of movement along the railway system on demand by a user of the autonomous vehicle, each of the autonomous vehicles comprising:

a pod or car comprising at least one to ten seating or standing regions, the pod being coupled to a drive train, the drive train being coupled to a track of the railway system;

a communication device comprising a transmitter and a receiver, the communication device being capable of receiving an instruction from a user via a mobile communication device of the user to connect with the user through a communication network;

a controller device coupled to the communication device to initiate movement of the drive train of the autonomous vehicle to move the autonomous vehicle to pick up the user from a pickup location along the railway system and to move the autonomous vehicle, independently from the other plurality of autonomous vehicles, along the railway system to a destination location.

21. The system of claim 20 wherein the autonomous vehicle comprising a sensor array system configured spatially on the autonomous vehicle (AV); at least one processor device coupled to the sensor array system; a memory device coupled to the processing device; an instruction stored on the memory device, the instruction when executed by the processor causes the sensor array system to, as the AV travels a current route on the rail of the railway system to dynamically detect a reflectance of an event from a plurality of events, the event being selected from an anomaly, a stationary feature, or a location of one of the other plurality of vehicles; and using data from the reflectance of the event or the plurality of events to adjust a movement of the AV in relationship to the event.

22. The system of claim 21 wherein the drive train comprises a motor or engine coupled to a drive mechanism coupled to at least a pair of wheels, each of which is coupled to the track.

23. The system of claim 20 wherein each of the autonomous vehicles run along the railway system independent of the other autonomous vehicles, or run coupled to at least one or more other autonomous vehicles to form an autonomous train.

* * * * *